US009398403B2

(12) United States Patent
Yoakum

(10) Patent No.: US 9,398,403 B2
(45) Date of Patent: Jul. 19, 2016

(54) PROVIDING MOBILE DEVICE LOCATION AS A PROXY LOCATION FOR AN ACCESS POINT IN RESPONSE TO MOBILE DEVICE ASSOCIATION WITH THE ACCESS POINT, AND RELATED METHODS, DEVICES, AND SYSTEMS

(75) Inventor: John H. Yoakum, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 308 days.

(21) Appl. No.: 13/545,314

(22) Filed: Jul. 10, 2012

(65) Prior Publication Data

US 2014/0018110 A1 Jan. 16, 2014

(51) Int. Cl.
*H04W 24/00* (2009.01)
*H04W 4/02* (2009.01)

(52) U.S. Cl.
CPC ...................... *H04W 4/02* (2013.01)

(58) Field of Classification Search
CPC .................................. H04W 84/22
USPC ..................................... 455/456.5
See application file for complete search history.

(56) References Cited

U.S. PATENT DOCUMENTS

| 6,466,938 | B1 * | 10/2002 | Goldberg | 342/357.31 |
| 8,200,239 | B2 * | 6/2012 | Mia et al. | 455/456.1 |
| 8,483,705 | B1 * | 7/2013 | Cope et al. | 455/456.1 |
| 8,570,993 | B2 * | 10/2013 | Austin et al. | 370/338 |
| 2012/0046110 | A1 * | 2/2012 | Amaitis et al. | 463/42 |
| 2013/0260782 | A1 * | 10/2013 | Un | H04W 64/00 455/456.1 |

OTHER PUBLICATIONS

"Apple Q&A on Location Data," Apple Press Info, Apr. 27, 2011, 2 pages, accessed Apr. 24, 2012, http://www.apple.com/pr/library/2011/04/27Apple-Q-A-on-Location-Data.html.
Vaughan-Nichols et al., "How Google-and everyone else-gets Wi-Fi location data," Nov. 16, 2011, 3 pages accessed Apr. 24, 2012, http://www.zdnet.com/blog/networking/how-google-8211and-everyone-else-8211gets-wi-fi-location-data/1664.

* cited by examiner

*Primary Examiner* — Amancio Gonzalez
(74) *Attorney, Agent, or Firm* — Sheridan Ross P.C.

(57) ABSTRACT

Providing mobile device location as a proxy location for an access point in response to mobile device association with the access point, and related methods, devices, and systems are disclosed. In one embodiment, a mobile device receives signals from a transmitter(s). Based on the received signals, the mobile device determines its current location. The mobile device also establishes an association with an access point device. In response to the association, the mobile device transmits to a location server an identification of the access point device and the current location of the mobile device as a proxy location for the access point device. In this manner, the location server may determine a location of the access point device while maintaining the privacy of user(s) of the mobile device(s). The location server may provide the access point device location to user device(s) to allow the user device(s) to determine its location.

17 Claims, 6 Drawing Sheets

PROVIDING MOBILE DEVICE LOCATION AS A PROXY LOCATION FOR AN ACCESS POINT IN RESPONSE TO MOBILE DEVICE ASSOCIATION WITH THE ACCESS POINT, AND RELATED METHODS, DEVICES, AND SYSTEMS

BACKGROUND

1. Field of the Disclosure

The technology of the disclosure relates to methods, devices, and systems for facilitating determining locations of access point devices.

2. Technical Background

A user device can provide location-based services if the location of the user device is known. However, a user device may be unable to determine its location or receive information about its location. In this regard, FIG. 1 illustrates a user device(s) 10. A location system 12 is provided that is capable of providing location information via location signals to the user device(s) 10. The location information may indicate the relative location of the user device(s) 10 or provide information that allows the user device(s) 10 to determine is relative or actual location. However, the user device(s) 10 may not be able to receive these signals containing location information from the location system 12. For example, signals from a global positioning satellite (GPS) transmitter(s) 14, a cellular transmitter(s) 16, a location beacon(s) 18, and/or a location tag(s) 20 that may be provided as part of the location system 12 and are capable of providing location information may be obstructed from being received by the user device(s) 10. Furthermore, the user device(s) 10 may not include a receiver that is capable of receiving signals containing location information from the location system 12.

The user device(s) 10 may also be capable of receiving communications signals from other devices, such as an access point device(s) 22 coupled to a network 24 in FIG. 1. But, the access point device(s) 22 may not be aware of its location to provide location information to the user device(s) 10.

SUMMARY OF THE DETAILED DESCRIPTION

Embodiments disclosed in the detailed description include providing mobile device location as a proxy location for an access point in response to mobile device association with the access point, and related methods, devices, and systems. In this regard in one embodiment, a mobile device is disclosed. The mobile device is configured to receive communications signals from a transmitter(s). Based on the received communications signals, the mobile device is further configured to determine a current location of the mobile device. The mobile device is further configured to establish an association with an access point device. In response to the association, the mobile device is further configured to transmit an identification of the associated access point device and the current location of the mobile device to a location server. The current location of the mobile device is provided as a proxy location for the access point device. In this manner, the location server receives and can store a location for the access point device. The location server can also provide the location to user devices that associate with the access point device as a relative location of the user devices. Therefore, if the user devices are not capable of determining their own location, the user devices may be able to use the received location of the access point device as a proxy location. Furthermore, location privacy of a user of the mobile device may be maintained.

In another embodiment, a method of a mobile device is disclosed. The method comprises receiving communications signals from a transmitter(s). The method further comprises determining a current location of the mobile device based on the received communications signals. The method further comprises establishing an association with an access point device coupled to a network. The method further comprises transmitting to a location server an identification of the associated access point device and the current location information of the mobile device as a proxy location of the access point device in response to the association with the access point device.

In another embodiment, a non-transitory computer-readable medium is disclosed. The computer-readable medium stores one or more programs. The one or more programs comprise instructions, which when executed by a mobile device cause the mobile device to implement a method. The method comprises receiving communications signals from a transmitter(s). The method further comprises determining a current location of the mobile device based on the received communications signals. The method further comprises establishing an association with an access point device coupled to a network. The method further comprises transmitting to a location server an identification of the associated access point device and the current location of the mobile device as a proxy location for the access point device in response to the association with the access point device.

In another embodiment, a location server is disclosed. The location server is configured to receive an identification of an access point device associated with a mobile device and a current location of the mobile device as a proxy location of the access point device. The location server is further configured to update a location of the identified access point device in an access point device location database based on the current location of the mobile device. The location server is further configured to transmit the location of the access point device to a user device. The user device may determine its location based on the location of the access point device.

In another embodiment, a location system is disclosed. The location system comprises a mobile device. The mobile device is configured to receive communications signals from a transmitter(s). The mobile device is further configured to determine a current location of the mobile device based on the received communications signals. The mobile device is further configured to establish an association with an access point device coupled to a network. In response to the association, the mobile device is further configured to transmit to a location server an identification of the access point device and the current location of the mobile device. The current location of the mobile device is provided as a proxy location for the access point device. The location system also comprises the location server. The location server is configured to receive the identification of the access point device associated with the mobile device and the current location of the mobile device as the proxy location of the access point device. The location server is further configured to update a location of the identified access point device in an access point device location database based on the current location of the mobile device. The location server is further configured to transmit the location of the access point device to a user device. The user device may determine its location based on the location of the access point device. Based on the determined location of the user device, the user device may provide location-based services to a user.

BRIEF DESCRIPTION OF THE FIGURES

The accompanying drawing figures incorporated in and forming a part of this specification illustrate several aspects of the disclosure, and together with the description serve to explain the principles of the disclosure.

DETAILED DESCRIPTION

Figure 1:
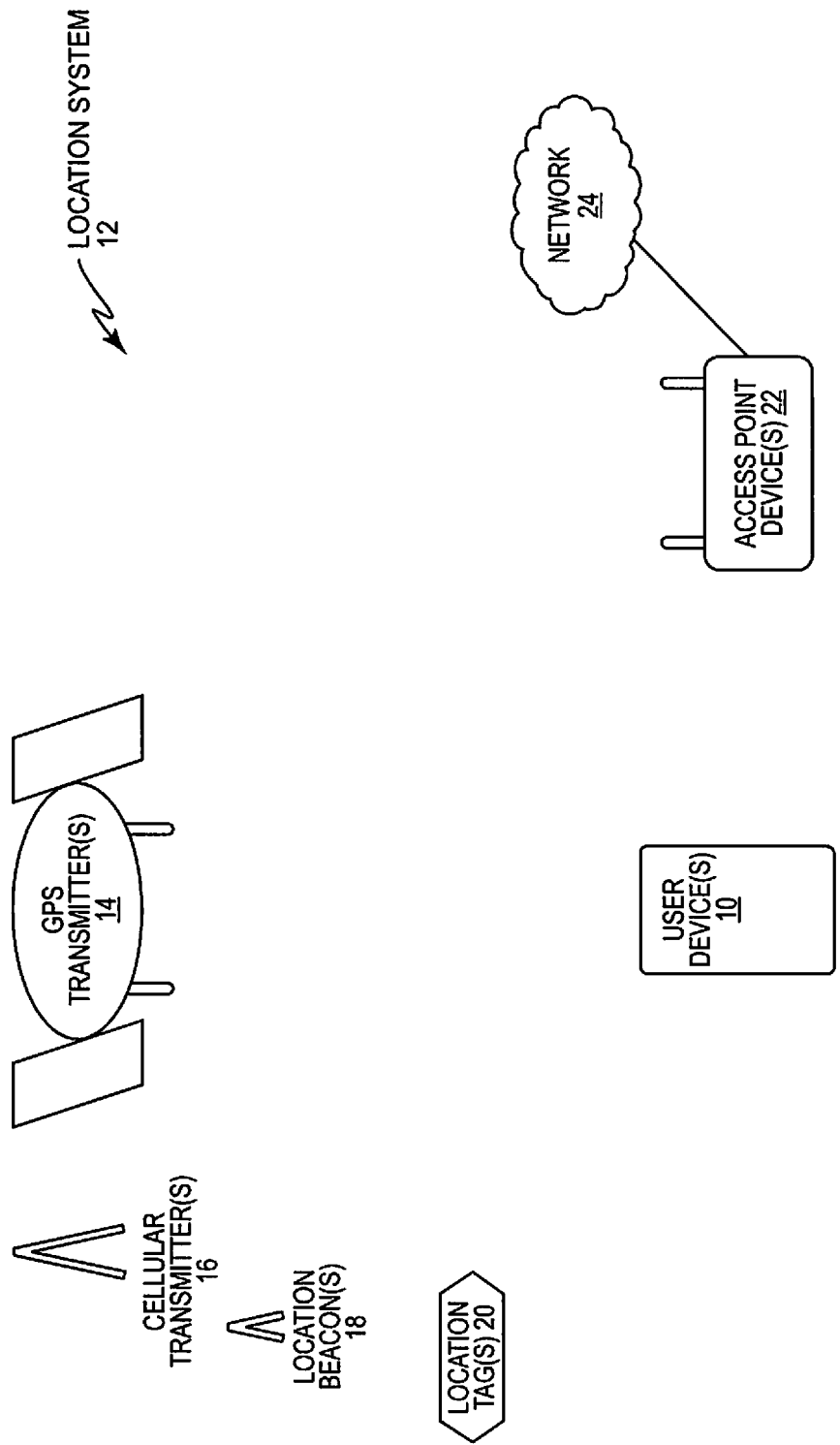
FIG. 1 is a block diagram illustrating a user device(s) which is unable to determine its location.

With reference now to the drawing figures, several exemplary embodiments of the present disclosure are described. The word "exemplary" is used herein to mean "serving as an example, instance, or illustration." Any embodiment described herein as "exemplary" is not necessarily to be construed as preferred or advantageous over other embodiments.

Embodiments disclosed in the detailed description include providing mobile device location as a proxy location for an access point in response to mobile device association with the access point, and related methods, devices, and systems. In this regard in one embodiment, a mobile device is disclosed. The mobile device is configured to receive communications signals from a transmitter(s). Based on the received communications signals, the mobile device is further configured to determine a current location of the mobile device. The mobile device is further configured to establish an association with an access point device. In response to the association, the mobile device is further configured to transmit to a location server an identification of the associated access point device and the current location of the mobile device. The current location of the mobile device is provided as a proxy location for the access point device. In this manner, the location server receives and can store a location for the access point device. The location server can also provide the location to user devices that associate with the access point device as a relative location of the user devices. Therefore, if the user devices are not capable of determining their own location, the user devices may be able to use the received location of the access point device as a proxy location. Also in this manner, privacy of a user of the mobile device may be maintained.

A "proxy location" of an access point device is a location that is relatively near the location of the access point device. When an actual location of the access point device is unknown, a proxy location may be used as an approximate location of the access point device. For example, a mobile device establishing an association with an access point device may be relatively near the access point device (e.g., at the location of the access point device and/or within a wireless communications range of the access point device). The location of the mobile device may be provided as a proxy location for the access point device.

As a non-limiting example, a mobile device may be able to establish an association with an 802.11g access point device when located within 30 meters of the 802.11g access point device. Accordingly, the location of the mobile device may be provided as a proxy location within 30 meters of the 802.11g access point device. As a further non-limiting example, a mobile device may be able to establish an association with an 802.11n access point device when located within 50 meters of the 802.11n access point device. As a result, the location of the mobile device may be provided as a proxy location within 50 meters of the 802.11n access point device.

Figure 2:
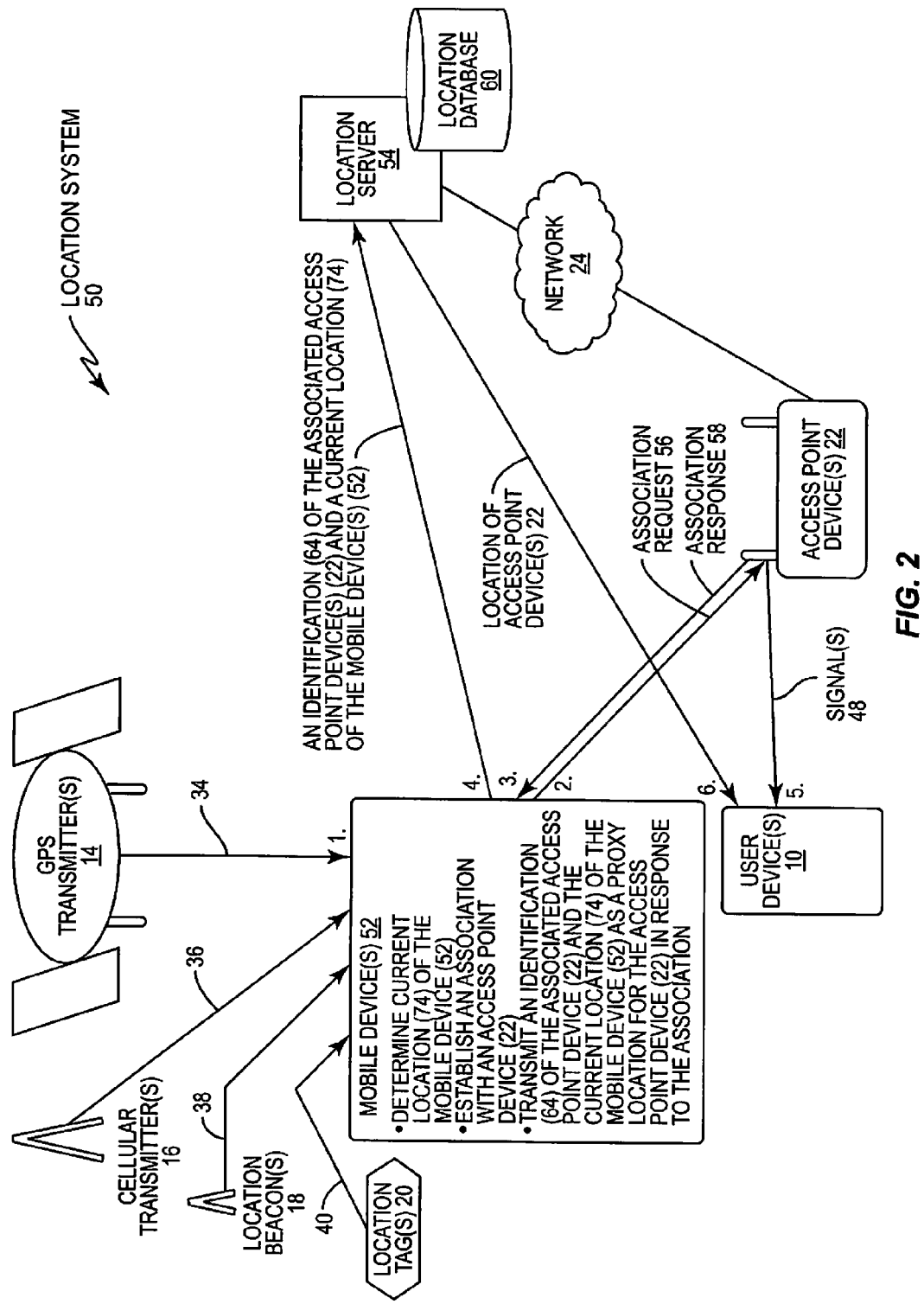
FIG. 2 is an exemplary network diagram of a location system comprising a mobile device which establishes an association with an access point device, and transmits an identification of the associated access point device and a current location of the mobile device as a proxy location for the access point device in response to the association with the access point device.

In this regard referring now to FIG. 2, an exemplary location system 50 providing mobile device location as a proxy location for an access point in response to mobile device association with the access point is disclosed. The location system 50 employs a mobile device(s) 52 and a location server 54 to aid the user device(s) 10 in determining its location. The mobile device(s) 52 is configured to receive communications signals from a transmitter(s) (as non-limiting examples, GPS signals 34 from the GPS transmitter(s) 14, cellular signals 36 from the cellular transmitter(s) 16, location beacon signals 38 from the location beacon(s) 18, and/or location tag signals 40 from the location tag(s) 20) (message 1). The mobile device(s) 52 determines its current location based on the received communications signals. As a non-limiting example, the current location may be a current latitude and a current longitude of the mobile device 52.

The mobile device 52 is further configured to establish an association with an access point device 22 coupled to a network 24. As used herein, an "association" is a relationship established between a mobile device 52 and an access point device 22 that permits the mobile device 52 to communicate messages (as a non-limiting example, Internet Protocol (IP) packets) through the access point device 22 to a network 24 coupled to the access point device 22. To establish the association, the mobile device 52 transmits an association request message 56 (message 2) (as a non-limiting example, an 802.11 association request frame) to the access point device 22. If the association is permitted, the access point device 22 will reply with an association response message 58 (message 3) (as a non-limiting example, an 802.11 association response frame) indicating that the association was successful. Once the association has been established, the mobile device 52 may communicate messages through the access point device 22 to the network 24.

In response to successfully establishing the association, the mobile device 52 is configured to transmit an identification 64 of the access point device 22 with which the mobile device 52 established the association to the location server 54 (message 4). Also in response to successfully establishing the association, the mobile device 52 is configured to transmit the current location of the mobile device 52 to the location server 54 (message 4). The current location of the mobile device 52 is the most recently determined location of the mobile device 52 at the time that the mobile device 52 receives the successful association response message 58. The current location of the mobile device 52 is provided as a proxy location for the access point device 22. In this manner, the location server 54 is able to determine the location of the access point device(s) 22 while maintaining the privacy of a user(s) of the mobile device 52. The mobile device 52 may transmit the identification 64 of the access point device 22 and current location of the mobile device 52 (message 4) to the location server 54 through the access point device 22 and network 24. Alternatively, the mobile device 52 may transmit to the location server 54 through a different route.

The location system 50 also comprises the location server 54. The location server 54 is configured to receive the identification 64 of the access point device 22 and the current location of the mobile device 52 as the proxy location of the access point device 22. The location server 54 is further configured to update a location of the identified access point device 22 in an access point device location database 60 based on the current location information of the mobile device 52. The location server 54 is further configured to transmit the location of the access point device 22 to the user device(s) 10. The location of the access point device 22 may allow the user device(s) 10 to determine a location of the user device(s) 10 based on the location of the access point device 22. Based on the determined location of the user device(s) 10, the user device(s) 10 may provide location-based services to a user.

The user device(s) 10 receives a communications signal(s) 48 from the access point device(s) 22 (message 5). As non-limiting examples, the communications signal(s) 48 may be a beacon message (e.g., an 802.11 beacon message), a probe response message (e.g., an 802.11 probe response message), and/or an association response message (e.g., an 802.11 association response message). The user device(s) 10 also receives the identification 64 of the access point device 22 and the updated location of the access point device 22 from the location server 54 (message 6). These may be provided as part of a subset of the access point device location database 60 transmitted to the user device(s) 10. The user device(s) 10 determines its location based on the location of the access point device 22. Based on the determined location of the user device(s) 10, the user device(s) 10 may provide one or more location-based services to a user. The location server 54 may transmit the location of the access point device 22 (message 6) to the user device 10 through the network 24 and the access point device 22. Alternatively, the location server 54 may transmit to the user device 10 through a different route.

As used herein, a "location-based service" is a software application, software program, or software component providing a service to a user based on the location of the user and/or the location of a device of the user. As a non-limiting example of an exemplary location-based service, an application may provide a listing or map of nearby restaurants, retail stores, and/or other businesses to a user based on the current location of the user device(s) 10 of the user. As a further non-limiting example of a location-based service, an application may provide a local weather forecast to a user based on the current location of the user device(s) 10 of the user.

The only location of the mobile device 52 that the mobile device 52 may transmit to the location server 54 is the current location 74 of the mobile device 52. In other words, the mobile device 52 may only transmit the most recently determined location of the mobile device 52 at the time that the mobile device 52 establishes the association with the access point device 22. The mobile device 52 may not transmit historical locations (i.e. any locations of the mobile device 52 prior to its most recently determined location) to the access point device 22. In other words, the only location of the mobile device 52 that is transmitted in response to establishing an association with the access point device 22 is the current location 74 of the mobile device 52. Furthermore, the mobile device 52 may only transmit its location in response to establishing the association with the access point device 22. In other words, the mobile device 52 may only transmit its location in response to receiving a successful association response message 58 from the access point device 22. The mobile device 52 may not otherwise transmit its location to the location server 54. In this manner, the location server 54 is provided the current location 74 of the mobile device 52 as a proxy location of the access point device(s) 22, while maintaining the privacy of a user(s) of the mobile device(s) 52.

In addition, the location system 50 is configured to not provide a unique identity of the mobile device 52 to the location server 54. As a result, the location server 54 cannot correlate a particular mobile device 52 with the current location information received from the mobile device 52. In this regard, the mobile device 52 may not provide a media access control (MAC) address of the mobile device 52, an International Mobile Equipment Identity (IMEI) address of the mobile device 52, a phone number of the mobile device 52, a username of the mobile device 52, a password of the mobile device 52, and/or a static Internet Protocol (IP) address of the mobile device 52 to the location server 54. In this manner, the location server 54 is able to determine the location of the access point device(s) 22 while maintaining the location privacy of a user(s) of the mobile device(s) 52.

To ensure that the mobile device 52 does not provide a unique identity of the mobile device 52 to the location server 54, the mobile device 52 may be configured to provide a blank IP address (e.g., "0.0.0.0") in the source IP address field of a packet(s) transmitted to the location server 54. Because many different mobile devices 52 may provide a blank source IP address, a blank source IP address does not uniquely identify a mobile device 52. Alternatively, the mobile device 52 may be configured to provide a dynamic IP address as the source IP address. Because different mobile devices 52 may use a same dynamic IP address over time, a dynamic IP address also does not provide a unique identity of the mobile device 52.

Figure 3:
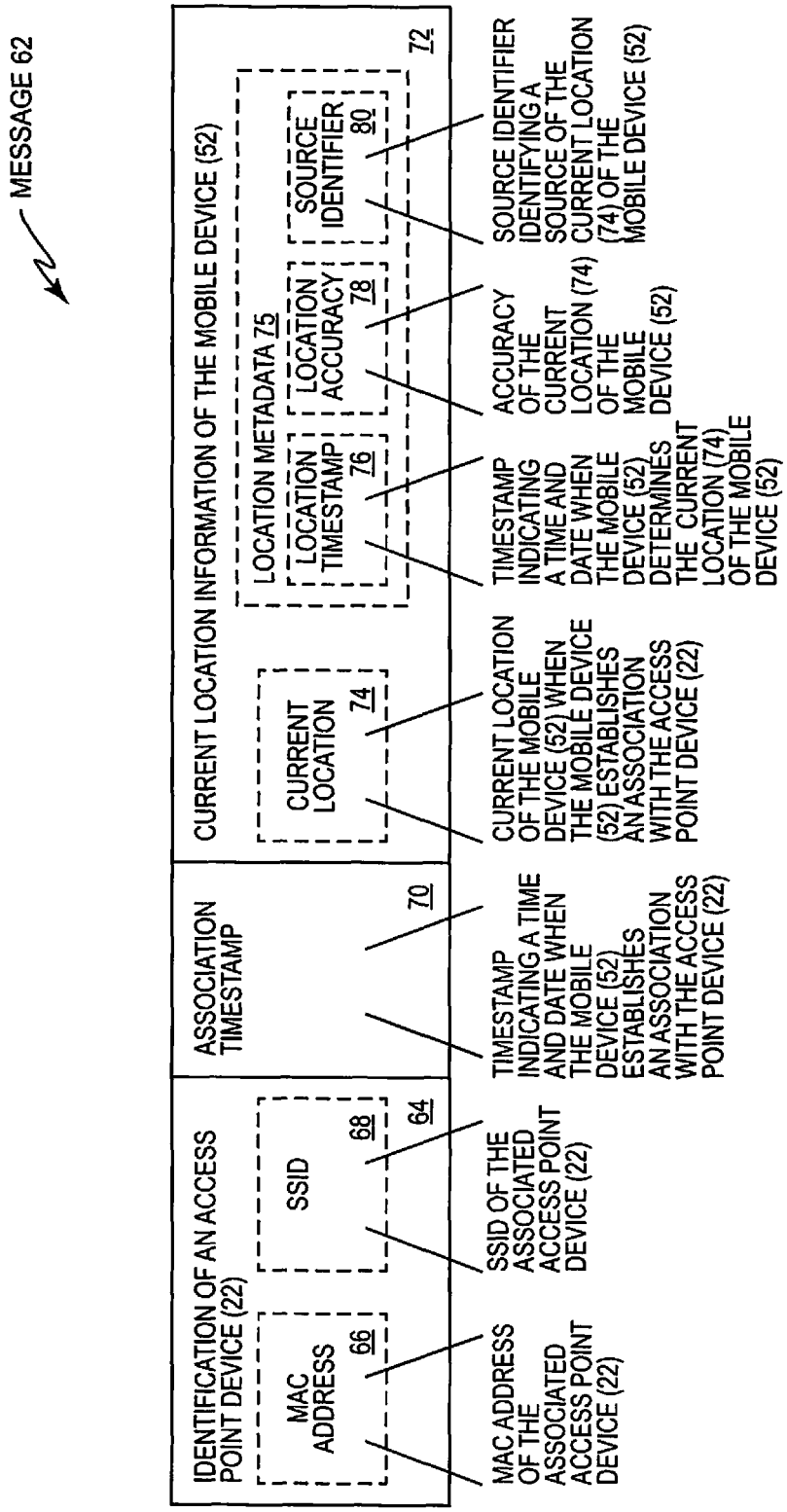
FIG. 3 is a block diagram of an exemplary message, which may be transmitted by the mobile device of FIG. 2 to the location server of FIG. 2.

FIG. 3 illustrates an exemplary message 62 that the mobile device 52 may transmit to the location server 54 (message 4 of FIG. 2). The message 62 may be provided in a data packet. As a non-limiting example, the message 62 may be provided as a payload of a User Datagram Protocol (UDP) packet and/or an Internet Protocol (IP) packet. As illustrated in FIG. 3, the message 62 comprises an identification 64 of an access point device 22 with which the mobile device 52 established an association. The identification 64 may uniquely identify the access point device 22. As a non-limiting example, the identification 64 may comprise a media access control (MAC) address 66 of the access point device 22 and/or a network name 68 of the access point device 22, such as a service set identifier (SSID) of the access point device 22. The message 62 may also comprise an association timestamp 70 indicating a time and date when the mobile device 52 established the association with the access point device 22.

As also illustrated in FIG. 3, the message 62 also comprises current location information 72 of the mobile device 52 (i.e., the most recently known location information of the mobile device 52 when the mobile device 52 establishes the association with the access point device 22). The current location information 72 comprises a current location 74 of the mobile device 52 (i.e., the most recently known location of the mobile device 52 when the mobile device 52 establishes the association with the access point device 22).

The current location information 72 may also comprise location metadata 75 regarding the current location 74 of the mobile device 52. The location server 54 may determine whether to update the location of the access point device 22 based on the location metadata 75. For example, the current location information 72 may also comprise a location timestamp 76 indicating a time and date when the mobile device 52 determined the current location 74 of the mobile device 52. The association timestamp 70 and location timestamp 76 may be compared to determine how current the current location information 72 is. If a difference in the location timestamp 76 and the association timestamp 70 exceeds a predetermined amount of time, the current location information 72 may be deemed not current enough for updating the location of the access point device 22 in the location database 60. In this regard, the location server 54 may be configured to update the location of the access point device 22 in the access point device location database 60 to be the current location 74 of the mobile device 52 if a difference in time between the association timestamp 70 and the location timestamp 76 is less than a predetermined amount of time.

The current location information 72 may also comprise other location metadata 75 regarding the current location 74 of the mobile device 52. In this regard, the current location information 72 may also comprise a location accuracy 78 indicating the accuracy of the current location 74 of the mobile device 52. The location accuracy 78 may be determined by the mobile device 52 based on the communications signals 34, 36, 38, 40 received from the transmitters (as non-limiting examples, transmitters 14, 16, 18, and/or 20). For example, if the current location 74 of the mobile device 52 was determined based on GPS signals 34 from GPS transmitters 14, the location accuracy 78 may be a GPS location accuracy. The location server 54 may be configured to update the location of the access point device 22 in the access point device location database 60 if the location accuracy 78 exceeds a predetermined accuracy threshold.

Certain source signals, transmitters, and/or receivers of mobile device location may be more reliable and/or accurate than other source signals, transmitters, and/or receivers of the mobile device location. In this regard, the current location information 72 may also comprise a source identifier 80 identifying a source of the current location 74 of the mobile device 52. As a non-limiting example, the source identifier 80 may identify the source as a type of signal (as non-limiting examples, "GPS," "CELLULAR TOWER," "LOCATION BEACON," and/or "LOCATION TAG"), or may identify a specific transmitter(s) from which the location was determined (for example, by providing a unique identifier of the transmitter). The source identifier 80 may also identify a method(s) used to determine the current location 74 of the mobile device 52 (as non-limiting examples, "GPS TRIANGULATION," "CELLULAR TOWER TRIANGULATION," "LOCATION BEACON TRIANGULATION," and/or "LOCATION TAG TRIANGULATION"). However, in the embodiments provided herein, the source identifier 80 may not provide a unique identifier of the mobile device 52. In this manner, the location server 54 is able to determine the location of the access point device(s) 22 while maintaining the privacy of a user(s) of the mobile device(s) 52.

Furthermore, the location server 54 may determine whether to update the location of the access point device 22 in the access point device location database 60 based on a combination of factors, including: the association timestamp 70, the current location 74, the location metadata 75, the location timestamp 76, the location accuracy 78, and/or the source identifier 80.

There are several advantages to the location system 50. For example, the location system 50 may not allow the location server 54 to track the locations of the mobile device(s) 52. The only location of the mobile device 52 that the location system 50 may provide to the location server 54 is the current location 74 of the mobile device 52 (i.e., the most recently determined location of the mobile device 52) at the time that the mobile device 52 establishes an association with the access point device 22. Furthermore, the message(s) 62 that are transmitted to the location server 54 do not provide a unique identity of the mobile device 52. Because the location system 50 may not allow the location server 54 to track the locations of the mobile device(s) 52, users of the mobile device(s) 52 may more likely allow their mobile device(s) 52 to participate in the location system 50.

Furthermore, the mobile device 52 is not required to create, store, or transmit a mobile device location history. An alternative location system may periodically transmit to a location server a history of locations of a mobile device and the access point devices 22 that the mobile device can hear at each location. The mobile device location history of the alternative location system may be stored on the mobile device and periodically transmitted from the mobile device to the location server. As a result, the alternative location system may allow the location server to track the locations of the mobile device. Furthermore, the mobile device location history stored on the mobile device in the alternative location system may be accessed by other applications running on the mobile device, allowing the other applications to track the user's location. In contrast, the location system 50 does not require a mobile device location history to be stored on the mobile device 52 and/or transmitted to the location server 54. Accordingly, the location server 54 and/or other applications may not track the locations of the mobile device 52. As a result, the location system 50 provides greater location privacy for a user(s) of the mobile device(s) 52.

Furthermore, the location system 50 may utilize a reduced amount of network bandwidth. A mobile device 52 may generally attempt to associate with an access point device 22 only after receiving explicit user authorization allowing the mobile device 52 to associate with the access point device 22. Accordingly, associations may be relatively infrequent. As a result, the location system 50 may transmit locations of mobile devices 52 less frequently than another location system transmitting mobile device locations based on a different condition(s).

Figure 4A:
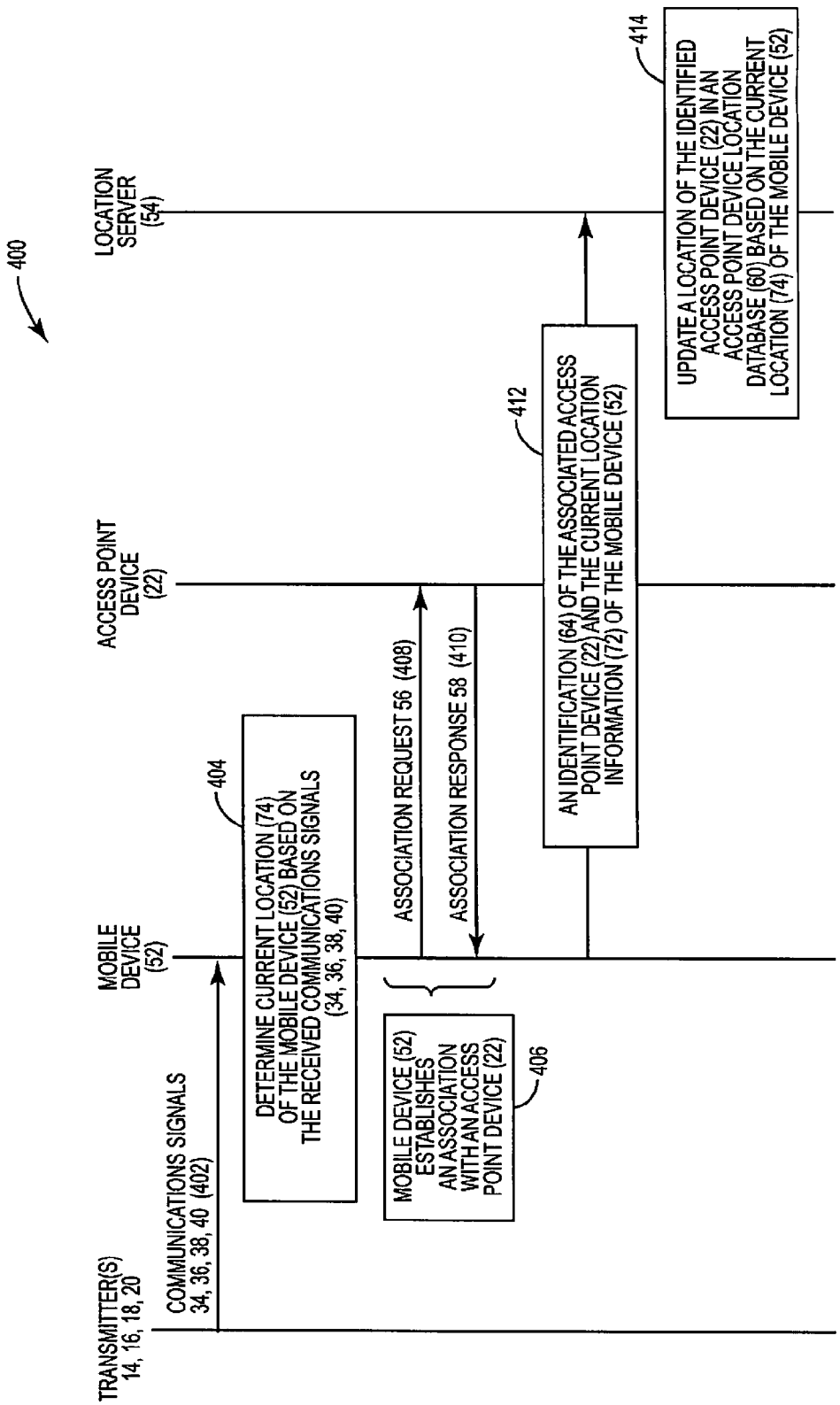
FIGS. 4A-4B illustrate an exemplary communications flow illustrating providing mobile device location as a proxy location for an access point device in response to mobile device association with the access point.
Figure 4B:
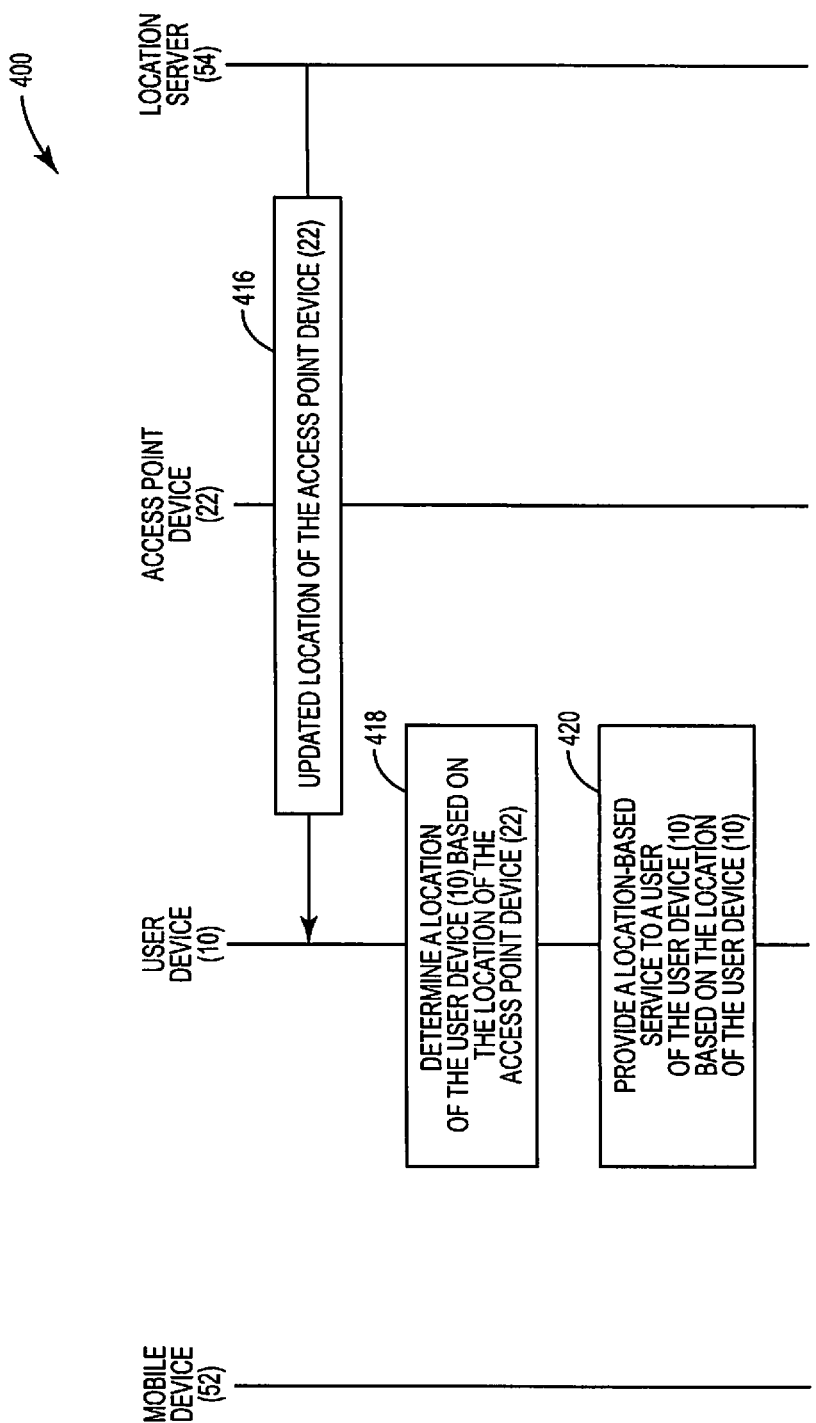

FIGS. 4A and 4B illustrate an exemplary communications flow 400 of the components of the location system 50 illustrated in FIG. 2. Referring now to FIG. 4A, communications signals (as non-limiting examples, GPS signals 34, cellular signals 36, location beacon signals 38, and/or location tag signals 40) are received from at least one transmitter (as non-limiting examples, GPS transmitter(s) 14, cellular transmitter(s) 16, location beacon(s) 18, and/or location tag(s) 20) (block 402). The mobile device 52 determines its current location 74 based on the received communications signals 34, 36, 38, 40 (block 404). The mobile device 52 establishes an association with an access point device 22 coupled to a network 24 (block 406). In this regard, the mobile device 52 may transmit an association request message 56 requesting an association of the mobile device 52 with the access point device 22 (block 408). The access point device 22 may respond to the mobile device 52 with an association response message 58 indicating that the requested association was successful (block 410). Because the requested association was successful, the mobile device 52 may access the network 24 through the access point device 22 for communications with other devices. In response to establishing the association with the access point device 22, the mobile device 52 transmits the current location 74 of the mobile device 52 and an identification 64 of the associated access point device 22 to a location server 54 (block 412). In this regard, the mobile device 52 may transmit the message 62 of FIG. 3 to the location server 54 (block 412). The location server 54 receives the current location 74 of the mobile device 52 and the identification 64 of the access point device 22 (block 412).

The location server 54 updates a location of the identified access point device 22 in an access point device location database 60 based on the current location 74 of the mobile device 52 (block 414).

Referring now to FIG. 4B, the location server 54 transmits the updated location of the access point device 22 to a user device 10 (block 416). The user device 10 determines a location of the user device 10 based on the location of the access point device 22 (block 418). Based on the determined location of the user device 10, the user device 10 provides a location-based service to a user of the user device 10 (block 420). In this manner, the location server 54 is able to determine the location of the access point device(s) 22 while maintaining the location privacy of a user(s) of the mobile device(s) 52. Also in this manner, the user device 10 may provide location-based services while maintaining the location privacy of the user(s) of the mobile device(s) 52.

An administrator of an access point device(s) 22 may desire that the location of the access point device(s) 22 not be transmitted to the location server 54. Accordingly, the access point device(s) 22 and/or a firewall device coupled to the network 24 may be configured to detect and block the transmission of the message 62 of FIG. 3. The access point device(s) 22 and/or firewall may block the transmission of the message 62 based on: a port (e.g., UDP port, TCP port) to which the message 62 was sent, the IP address of the location server 54 to which the message 62 is transmitted, and/or contents of the message 62. In that case, the location server 54 may not receive or populate location information in the location database 60 regarding those access point device(s) 22 whose location information was blocked.

The access point device 22 may be any type of wireless access point device. As a non-limiting example, the access point device 22 may be a wireless local area network (WLAN) access point. As a further non-limiting example, the access point device 22 may be an access point device implementing an IEEE 802.11 standard (also referred to as an "802.11 access point device" and/or a "Wi-Fi access point device"). As a further non-limiting example, the access point device 22 may be a wireless regional area network (WRAN) access point device. In this regard, the access point device 22 may be an access point device implementing an IEEE 802.22 standard (herein referred to as an "802.22 access point device"). As a further non-limiting example, the access point device 22 may be a white-space network access point device, such as an 802.11af access point device.

Although a single location server 54 is discussed regarding FIGS. 2, 3, 4A, and 4B, one of skill in the art will appreciate that a plurality of location servers (as a non-limiting example, a cluster of location servers) may collectively provide the functionality of the location server 54 discussed herein. In addition, although a single location database 60 is discussed regarding FIG. 2, one of skill in the art will appreciate that the location database 60 may comprise a plurality of location databases collectively providing the functionality of the location database 60 discussed herein.

Figure 5:
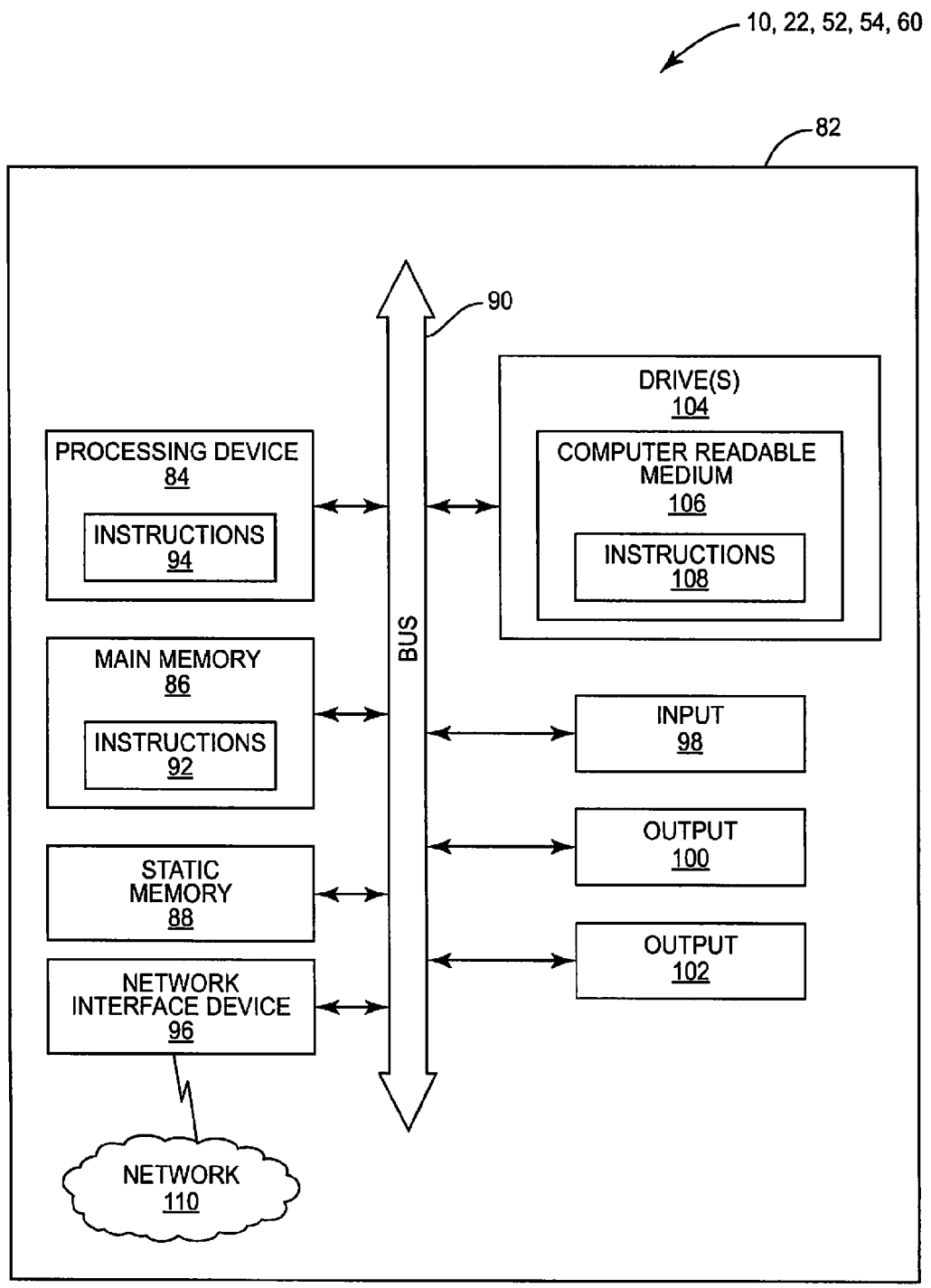
FIG. 5 is a block diagram of an exemplary processor-based device in the system of FIGS. 2 and/or 3, for implementing a user device, an access point device, a mobile device, a location server, and/or a location database, and configured to execute instructions from an exemplary computer-readable medium to perform the functions described herein.

FIG. 5 provides a schematic diagram representation of the mobile device 52 in the form of an exemplary computer system 82 adapted to execute instructions from an exemplary computer-readable medium to perform the functions described herein. In this regard, the mobile device 52 may comprise the computer system 82 within which a set of instructions for causing the mobile device 52 to perform any one or more of the methodologies discussed herein may be executed. The mobile device 52 may be connected (as a non-limiting example, networked) to other machines in a local area network (LAN), an intranet, an extranet, or the Internet. The mobile device 52 and the location server 54 may operate in a client-server network environment, or as a peer machine in a peer-to-peer (or distributed) network environment. While only a single mobile device 52 is illustrated, the terms "controller" and "server" shall also be taken to include any collection of machines that individually or jointly execute a set (or multiple sets) of instructions to perform any one or more of the methodologies discussed herein. The mobile device 52 may be a client, a server, a personal computer, a desktop computer, a laptop computer, a tablet, a personal digital assistant (PDA), a computing pad, a mobile device, or any other device and may represent, as non-limiting examples, a server or a user's computer.

The exemplary computer system 82 includes a processing device or processor 84, a main memory 86 (as non-limiting examples, read-only memory (ROM), flash memory, dynamic random access memory (DRAM) such as synchronous DRAM (SDRAM), etc.), and a static memory 88 (as non-limiting examples, flash memory, static random access memory (SRAM), etc.), which may communicate with each other via a bus 90. Alternatively, the processing device 84 may be connected to the main memory 86 and/or the static memory 88 directly or via some other connectivity means.

The processing device 84 represents one or more processing devices, such as a microprocessor, central processing unit, or the like. More particularly, the processing device 84 may be a complex instruction set computing (CISC) microprocessor, a reduced instruction set computing (RISC) microprocessor, a very long instruction word (VLIW) microprocessor, a processor implementing other instruction sets, or a set of processors implementing a combination of instruction sets. The processing device 84 is configured to execute processing logic in instructions 92 and/or cached instructions 94 for performing the operations and steps discussed herein.

The computer system 82 may further include a communications interface in the form of a network interface device 96. It also may or may not include an input 98 to receive input and selections to be communicated to the computer system 82 when executing instructions. The computer system 82 also may or may not include an output 100, including but not limited to display(s) 102, a video display unit (as non-limiting examples, a liquid crystal display (LCD), a cathode ray tube (CRT), or a light emitting diode (LED) display), an alphanumeric input device (as a non-limiting example, a keyboard), a cursor control device (as a non-limiting example, a mouse), and/or a touch screen device (as a non-limiting example, a tablet input device or screen).

The computer system 82 may or may not include a data storage device that includes using drive(s) 104 to store functions herein described in a computer-readable medium 106, on which is stored one or more sets of instructions 108 (e.g., software) embodying any one or more of the methodologies or functions described herein. The functions can include the methods and/or other functions of the user device(s) 10, access point device(s) 22, mobile device(s) 52, location server 54, and/or location database 60, as non-limiting examples. The instructions 108 may also reside, completely or at least partially, within the main memory 86 and/or within the processing device 84 during execution thereof by the computer system 82. The main memory 86 and the mobile device 52 also constitute machine-accessible storage media. The instructions 92, 94, and/or 108 may further be transmitted or received over a network 110 via the network interface device 96. The network 110 can be an intra-network or an inter-network.

While the computer-readable medium 106 is shown in an exemplary embodiment to be a single medium, the term "machine-accessible storage medium" should be taken to include a single medium or multiple media (as non-limiting examples, a centralized or distributed database, and/or associated caches and servers) that store the one or more sets of instructions 92, 94, and/or 108. The term "machine-accessible storage medium" shall also be taken to include any medium that is capable of storing, encoding or carrying a set of instructions for execution by the machine and that cause the machine to perform any one or more of the methodologies of the embodiments disclosed herein. The term "machine-accessible storage medium" shall accordingly be taken to include, but not be limited to, solid-state memories, optical and magnetic media, and carrier wave signals.

As also depicted in FIG. 5, the user device(s) 10, access point device(s) 22, mobile device(s) 52, location server 54, and/or location database 60 may also each be provided in the form of an exemplary computer system 82.

Providing mobile device location as a proxy location for an access point in response to mobile device association with the access point, and related methods, devices, and systems according to embodiments disclosed herein may be provided in or integrated into any processor-based device. Examples, without limitation, include a set top box, an entertainment unit, a navigation device, a communications device, a fixed location data unit, a mobile location data unit, a mobile phone, a cellular phone, an internet phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The user device(s) 10, access point device(s) 22, mobile device(s) 52, location server 54, and/or location database 60 described herein may be employed in any circuit, hardware component, integrated circuit (IC), or IC chip, as non-limiting examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a processor, a digital signal processor (DSP), an Application Specific Integrated Circuit (ASIC), an field programmable gate array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, as non-limiting examples, a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, as non-limiting examples, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. As non-limiting examples, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:
1. A mobile device, configured to:
   receive, by the mobile device, communications signals from at least one transmitter;
   determine, by the mobile device, a current location of the mobile device based on the received communications signals;
   establish, by the mobile device, an association with an access point device coupled to a network; and
   transmit, by the mobile device in response to successfully establishing the association with the access point device, a message to a location server, the message comprising:
   an identification of the associated access point device;
   the current location of the mobile device as a proxy location for the access point device; and a location timestamp indicating a time and date when the mobile device determined the current location of the mobile device.

2. The mobile device of claim 1, wherein the message does not comprise a unique identity of the mobile device.

3. The mobile device of claim 1, wherein the message further comprises an association timestamp indicating a time and date when the mobile device established the association with the access point device.

4. The mobile device of claim 1, wherein the message further comprises an accuracy of the current location of the mobile device.

5. The mobile device of claim 1, wherein the message further comprises a location source identifier identifying at least one of a type of signal of the received communication signals used to determine the current location of the mobile device and the at least one transmitter providing the received communication signals used to determine the current location of the mobile device.

6. The mobile device of claim 1, wherein the identification of the associated access point device comprises at least one of:
a media access control (MAC) address of the access point device; and
a service set identifier (SSID) of the access point device.

7. The mobile device of claim 1, wherein to establish the association with the access point device, the mobile device is further configured to:
transmit an association request message to the access point device requesting the association of the mobile device with the access point device; and
receive an association response message from the access point device indicating that the requested association was successful.

8. The mobile device of claim 1, wherein the association is an 802.11 association.

9. The mobile device of claim 1, wherein the at least one transmitter comprises at least one of the group consisting of: at least one global positioning system (GPS) transmitter, at least one cellular transmitter, at least one location beacon, and at least one location tag.

10. A method of a mobile device providing a proxy location for an access point device, comprising:
receiving, by the mobile device, communications signals from at least one transmitter;
determining, by the mobile device, a current location of the mobile device based on the received communications signals;
establishing, by the mobile device, an association with the access point device coupled to a network; and
transmitting, by the mobile device in response to successfully establishing the association with the access point device, a message to a location server, the message comprising:
an identification of the associated access point device;
the current location of the mobile device as the proxy location for the access point device; and
a location timestamp indicating a time and date when the mobile device determined the current location of the mobile device.

11. The method of claim 10, wherein the message does not comprise a unique identity of the mobile device.

12. A non-transitory computer-readable medium storing one or more programs, the one or more programs comprising instructions, which when executed by a mobile device cause the mobile device to implement a method, comprising:
receiving communications signals from at least one transmitter;
determining a current location of the mobile device based on the received communications signals;
establishing an association with an access point device coupled to a network; and
transmitting to a location server a message comprising:
an identification of the associated access point device;
the current location of the mobile device as a proxy location for the access point device in response to the association with the access point device; and
a location timestamp indicating a time and date when the mobile device determined the current location of the mobile device.

13. A location server, configured to:
receive, from a mobile device, a message comprising an identification of an access point device associated with the mobile device, a current location of the mobile device as a proxy location of the access point device, and a location timestamp indicating a time and date when the mobile device determined the current location of the mobile device;
update a location of the identified access point device in an access point device location database based on the current location of the mobile device; and
transmit the location of the identified access point device to a user device.

14. The location server of claim 13, configured to update the location of the identified access point device in the access point device location database to be the current location of the mobile device.

15. The location server of claim 13, the message further comprising:
an association timestamp indicating a time and date when the mobile device established the association with the access point device; and
the location server further configured to update the location of the identified access point device in the access point device location database to be the current location of the mobile device if a difference in time between the association timestamp and the location timestamp is less than a predetermined amount of time.

16. The location server of claim 13, further configured to transmit the location of the access point device to the user device to allow the user device to determine a location of the user device based on the location of the access point device.

17. A location system, comprising:
a first mobile device, configured to:
receive communications signals from at least one transmitter;
determine a current location of the mobile device based on the received communications signals;
establish an association with an access point device coupled to a network; and
transmit, in response to successfully establishing the association with the access point device, a message to a location server, the message comprising:
an identification of the associated access point device;
the current location of the mobile device as a proxy location for the access point device; and
a location timestamp indicating a time and date when the mobile device determined the current location of the mobile device; and the location server, configured to:
  receive the message;
  update a location of the identified access point device in an access point device location database based on the current location of the mobile device; and
  transmit the location of the identified access point device to a second mobile device.

\* \* \* \* \*